(12) United States Patent
Liu

(10) Patent No.: US 11,452,000 B2
(45) Date of Patent: Sep. 20, 2022

(54) METHOD FOR REPORTING DATA VOLUME OF DATA DUPLICATION, USER EQUIPMENT, AND NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/922,785

(22) Filed: Jul. 7, 2020

(65) Prior Publication Data
US 2020/0336247 A1 Oct. 22, 2020

Related U.S. Application Data

(63) Continuation of application No. PCT/CN2018/095205, filed on Jul. 10, 2018.

(30) Foreign Application Priority Data

Jan. 16, 2018 (WO) ................ PCT/CN2018/072898
Apr. 27, 2018 (WO) ................ PCT/CN2018/084920

(51) Int. Cl.
*H04L 1/04* (2006.01)
*H04L 1/08* (2006.01)
(Continued)

(52) U.S. Cl.
CPC ........... *H04W 28/0278* (2013.01); *H04L 1/04* (2013.01); *H04L 1/08* (2013.01); *H04L 5/0092* (2013.01);
(Continued)

(58) Field of Classification Search
CPC . H04L 1/02–04; H04L 1/08; H04L 5/00–001; H04L 5/0091–0098;
(Continued)

(56) References Cited

U.S. PATENT DOCUMENTS 9,628,586 B2 4/2017 Yi et al.
2005/0074024 A1 4/2005 Kim et al.
(Continued)

FOREIGN PATENT DOCUMENTS

CN 101674617 A 3/2010
CN 102056332 A 5/2011
(Continued)

OTHER PUBLICATIONS

Huawei, Catt, LG Electronics, HiSilicon, China Unicom, "New WID on 3GPP V2X Phase 2", 3GPP TSG RAN Meeting #75 RP-170798, Mar. 6-9, 2017.
(Continued)

*Primary Examiner* — Timothy J Weidner
(74) *Attorney, Agent, or Firm* — Perkins Coie LLP

(57) ABSTRACT

Provided are a method for reporting a data volume of data duplication, user equipment, a network device, and a non-transitory computer storage medium. The method includes: sending information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

15 Claims, 2 Drawing Sheets

(51) Int. Cl.

| | | |
|---|---|---|
| *H04L 5/00* | (2006.01) | |
| *H04L 45/74* | (2022.01) | |
| *H04W 8/22* | (2009.01) | |
| *H04W 24/08* | (2009.01) | |
| *H04W 24/10* | (2009.01) | |
| *H04W 28/02* | (2009.01) | |
| *H04W 72/04* | (2009.01) | |
| *H04W 72/10* | (2009.01) | |
| *H04W 76/11* | (2018.01) | |
| *H04W 76/15* | (2018.01) | |
| *H04W 84/02* | (2009.01) | |
| *H04W 88/06* | (2009.01) | |
| *H04W 88/10* | (2009.01) | |
| *H04W 92/02* | (2009.01) | |
| *H04W 92/10* | (2009.01) | |

(52) U.S. Cl.
CPC ............... *H04L 45/74* (2013.01); *H04W 8/22* (2013.01); *H04W 24/08* (2013.01); *H04W 24/10* (2013.01); *H04W 28/0252* (2013.01); *H04W 72/0406* (2013.01); *H04W 72/0453* (2013.01); *H04W 72/0493* (2013.01); *H04W 72/10* (2013.01); *H04W 76/11* (2018.02); *H04W 76/15* (2018.02); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC ............ H04L 45/74; H04W 8/22–245; H04W 24/02–10; H04W 28/02–26; H04W 72/005–14; H04W 76/10–50; H04W 84/02–16; H04W 88/02–12; H04W 92/02; H04W 92/04; H04W 92/10
See application file for complete search history.

(56) References Cited

U.S. PATENT DOCUMENTS

| | | | |
|---|---|---|---|
| 2013/0176988 A1 | 7/2013 | Wang | |
| 2015/0382336 A1 | 12/2015 | Zhang et al. | |
| 2016/0323790 A1 | 11/2016 | Wang et al. | |
| 2017/0006608 A1 | 1/2017 | Josiam et al. | |
| 2018/0317130 A1* | 11/2018 | Jin | H04W 28/0278 |
| 2018/0324642 A1* | 11/2018 | Yu | H04W 76/15 |
| 2020/0068651 A1* | 2/2020 | Xu | H04W 28/0278 |

FOREIGN PATENT DOCUMENTS

| | | | |
|---|---|---|---|
| CN | 102111751 | A | 6/2011 |
| CN | 102783234 | A | 11/2012 |
| CN | 103039109 | A | 4/2013 |
| CN | 103973401 | A | 8/2014 |
| CN | 104936296 | A | 9/2015 |
| CN | 105359619 | A | 2/2016 |
| CN | 105580473 | A | 5/2016 |
| CN | 105960823 | A | 9/2016 |
| CN | 106303983 | A | 1/2017 |
| CN | 107241164 | A | 10/2017 |
| CN | 107277856 | A | 10/2017 |
| CN | 107342851 | A | 11/2017 |
| CN | 107438976 | A | 12/2017 |
| WO | 2005015857 | A1 | 2/2005 |
| WO | 2014110800 | A1 | 7/2014 |
| WO | 2017191952 | A1 | 11/2017 |
| WO | 2017196015 | A1 | 11/2017 |

OTHER PUBLICATIONS

Written Opinion of the International Search Authority in the international application No. PCT/CN2018/095205, dated Sep. 29, 2018.
Written Opinion of the International Search Authority in the international application No. PCT/CN2018/084920, dated Oct. 19, 2018.
Written Opinion of the International Search Authority in the international application No. PCT/CN2018/072898, dated Oct. 10, 2018.
Qualcomm Incorporated: "Buffer status reporting for PDCP duplication", 3GPP Draft; R2-1801431 Buffer Status Reporting for PDCP Duplication, 3rd Generation Partnership Project (3GPP), Mobile Competence Centre; 650, Route Des Lucioles; F-06921 Sophia-Antipolis Cedex; FR, vol. RAN WG2, no. Vancouver, Canada; Jan. 22, 2018-Jan. 26, 2018 Jan. 12, 2018 (Jan. 12, 2018), XP051386840, *the whole document *.
Vivo: "Clarification on the data available for transmission for PDCP duplication", 3GPP Draft; R2-1707076 Clarification on the Data Available for Transmission for PDCP Duplication, 3rd Generation Partnership Project (3GPP), Mobile Competence Centre; 650, Route Des Lucioles; F-0692, vol. RAN WG2, no. Qingdao, China; Jun. 27, 2017-Jun. 29, 2017 Jun. 17, 2017 (Jun. 17, 2017), XP051307325, *the whole document *.
Catt: "PDCP Duplication", 3GPP Draft; R2-1703114, 3rd Generation Partnership Project (3GPP), Mobile Competence Centre; 650, Route Des Lucioles; F-06921 Sophia-Antipolis Cedex; France, vol. RAN WG2, no. Spokane, USA; Apr. 3, 2017-Apr. 7, 2017 Apr. 3, 2017 (Apr. 3, 2017), XP051245053, Retrieved from the Internet: URL: http://www.3gpp.org/ftp/Meetings_3GPP_SYNC/RAN2/Docs/ [retrieved on Apr. 3, 2017] *the whole document *.
Vivo: "Discussion on the PDCP data volume calculation for PDCP duplication", 3GPP Draft; R2-1800891 Discussion on the PDCP Data Volume Calculation for PDCP Duplication, 3rd Generation Partnership Project (3GPP), Mobile Competence Centre; 650, Route Des Lucioles; F-06921 SOPH, vol. RAN WG2, no. Vancouver, Canada; Jan. 22, 2018-Jan. 26, 2018 Jan. 12, 2018 (Jan. 12, 2018), XP051386415, *the whole document *.
Supplementary European Search Report in the European application No. 18900912.9, dated Feb. 18, 2021.
International Search Report in the international application No. PCT/CN2018/095205, dated Sep. 29, 2018.
International Search Report in the international application No. PCT/CN2018/072898, dated Oct. 10, 2018.
International Search Report in the international application No. PCT/CN2018/084920, dated Oct. 19, 2018.
3GPP TSG-RAN WG2 #100 R2-1712737 (Resubmission of R2-1710764), Reno, USA, Nov. 27-Dec. 1, 2017; Agenda Item: 10.3.3.5; Source: Huawei, HiSilicon; Title: PDCP data volume calculation for packet duplication. 3 pages.
First Office Action of the Chinese application No. 202010429708.4, dated Jun. 9, 2021. 13 pages with English translation.
Second Office Action of the Chinese application No. 202010429708.4, dated Aug. 18, 2021. 9 pages with English translation.
Third Office Action of the Chinese application No. 202010429708.4, dated Oct. 15, 2021. 11 pages with English translation.
First Office Action of the Canadian application No. 3091941, dated Oct. 21, 2021. 3 pages.
Office Action of the Indian application No. 202017034230, dated Nov. 18, 2021. 5 pages with English translation.
LTE "Evolved Universal Terrestrial Radio Access (E-UTRA);Medium Access Control (MAC) protocol specification (3GPP TS36.321 version 14.3.0 Release 14)",ETSI Technical Specification, European Telecommunications Standards Institute (ETSI),vol. 3GPP RAN, No. V14.3.0; Jul. 27, 2017; 109 pages.
First Office Action of the European application No. 18900912.9, dated Nov. 24, 2021. 8 pages.
First Office Action of the Japanese application No. 2020-539031, dated Jul. 26, 2022. 16 pages with English Translation.
Vivo "PDCP duplication impacts on LCP" R2-1713005 revision of R2-1710968; 3GPP TSG-RAN WG2 Meeting #100; Reno, USA, Nov. 27-Dec. 1, 2017. 5 pages.
ZTE "Discussion on sidelink resource request mechanism in PC5 CA" R2-1713072; 3GPP TSG-RAN WG2 Meeting #100; Reno, USA, Nov. 27-Dec. 1, 2017. 7 pages.

* cited by examiner

US 11,452,000 B2

METHOD FOR REPORTING DATA VOLUME OF DATA DUPLICATION, USER EQUIPMENT, AND NETWORK DEVICE

CROSS-REFERENCE TO RELATED APPLICATIONS

This application is a continuation of International Application No. PCT/CN2018/095205, which was filed on Jul. 10, 2018 and claimed priority to International Application No. PCT/CN2018/072898 filed on Jan. 16, 2018 and International Application No. PCT/CN2018/084920 filed on Apr. 27, 2018, the content of which is herein incorporated by reference in their entirety.

TECHNICAL FIELD

The present disclosure relates to the field of information processing technologies, and in particular, to a method for reporting a data volume of data duplication, user equipment, a network device, and a computer storage medium.

BACKGROUND

For carrier aggregation (CA), in a solution supporting data duplication transmission, a duplicated PDCP PDU is respectively transmitted to two RLC entities (two different logical channels) by using a data duplication function of a PDCP (as shown in FIG. 1), and it is finally ensured that the duplicated PDCP PDU can be transmitted on different physical layer aggregated carriers. Therefore, frequency diversity gains are achieved to improve the reliability of data transmission.

However, when the above architecture is used to transmit data, how to make a network side know data volumes transmitted under different transmission modes of user equipment is a problem that needs to be resolved.

SUMMARY

To resolve the above technical problem, embodiments of the present disclosure provide a method for reporting a data volume of data duplication, user equipment, a network device, and a computer storage medium.

An embodiment of the present disclosure provides a method for reporting a data volume of data duplication, applied to user equipment, and the method includes:

sending information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

An embodiment of the present disclosure provides user equipment, and the user equipment includes: a processor; a memory configured to store instructions executable by the processor; and a network device, connected with the processor and the memory, and configured to send and receive information under control of the processor.

The processor is configured to control the network interface to send information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

An embodiment of the present disclosure provides a non-transitory computer storage medium, where the computer storage medium stores computer executable instructions that, when executed by a processor of a terminal device, cause the terminal device to implement steps of the above method.

Through the technical solutions of the embodiments of the present disclosure, the data volumes of the duplicated data and the non-duplicated data can be distinguishably reported to the network side by using the different logical channels, logical channel groups, destination addresses, or destination address identifiers, so that the network side can know a sending status of information about the UE side. Therefore, a problem that the network side cannot know data volumes that are transmitted by the UE under different transmission modes can be resolved.

DETAILED DESCRIPTION

Figure 1:
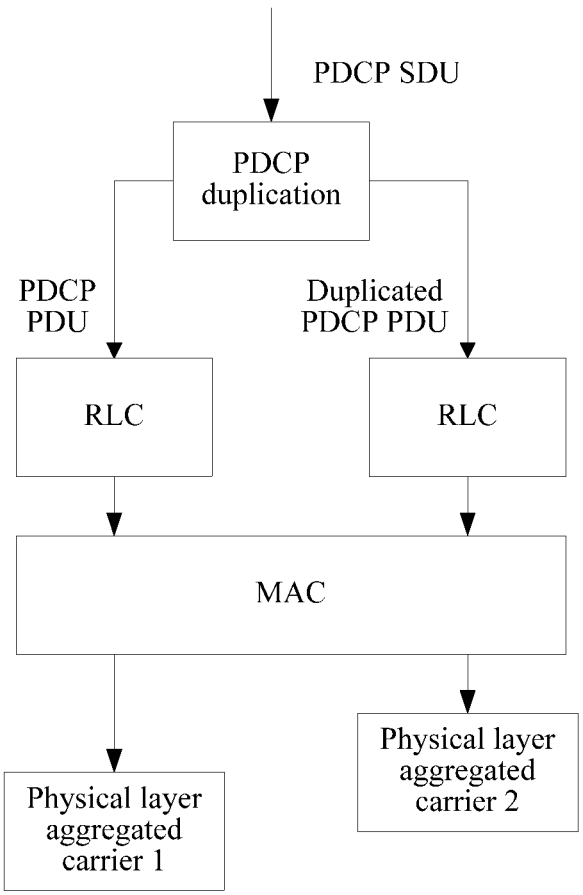
FIG. 1 is a schematic structural diagram of a dual-connectivity network.

To understand characteristics and technical contents of embodiments of the present disclosure in more detail, the implementations of the embodiments of the present disclosure are described with reference to the accompanying drawings. The accompanying drawings are merely used for description, but are not used to limit the embodiments of the present disclosure.

Embodiment 1

An embodiment of the present disclosure provides a method for reporting a data volume of data duplication, applied to user equipment, and the method includes:

sending information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

That is, the user equipment needs to distinguishably report data volumes that are used for duplication and non-duplication by using at least one of the following: the logical channel, the logical channel group, the destination address, and the destination address identifier.

The manner in which a user reports, that is, the sending information about data volumes of to-be-reported duplicated data and non-duplicated data to a network side includes:

sending the information about the data volumes of the to-be-reported duplicated data and non-duplicated data to the network side through radio resource control (RRC) information and/or a MAC CE.

Two manners are described separately. Scenario 1: when the destination address or the destination address identifier is used:

A manner is: reporting different destination addresses or different destination address identifiers that are used to distinguish the data volumes of the duplicated data and the non-duplicated data to the network side.

That is, the user distinguishably reports a destination address that is used for duplication and a destination address that is used for non-duplication to a network.

Another manner is: reporting reliability requirement information of the duplicated data and the non-duplicated data that correspond to different destination addresses or destination address identifiers to the network side.

That is, the user may send reliability requirement information corresponding to different data to the network side, and then send the corresponding duplicated data, and the reliability requirement information and a data volume that correspond to the duplicated data at the different destination addresses or destination address identifiers. The user may also send the non-duplicated data, and the reliability requirement information and a data volume that correspond to the non-duplicated data.

The reliability requirement information includes at least one of the following: whether data is associated with a reliability requirement; and a specific value of the reliability requirement information.

That is, whether the target data is associated with the reliability requirement may be included in the reliability requirement information. In addition, specific data in the reliability requirement information may be further included. For example, different data in data 1, 2, and 3 may correspond to a reliability requirement A or B or C, or may merely correspond to a certain specific value thereof. Examples are not fully listed herein.

Further, the sending information about data volumes of to-be-reported duplicated data and non-duplicated data to a network side includes:

reporting the information about the data volumes of the duplicated data and the non-duplicated data that is distinguished by using different destination addresses or different destination address identifiers to the network side.

In addition, before the above processing is performed, the network side may further control whether to allow data with a specific destination address to be used for duplication. Specifically, before the sending information about data volumes of to-be-reported duplicated data and non-duplicated data to a network side, the method further includes:

receiving configuration information sent from the network side, where the configuration information includes information about whether the network side allows the user equipment to perform data duplication on the destination addresses or the destination address identifiers.

Accordingly, when the configuration information allows the data duplication, the subsequent processing may be performed; otherwise, the data duplication is not performed.

Then the user distinguishes data volumes that are used for duplication and non-duplication and reported by using the different destination addresses and/or destination address identifiers.

Further, the method further includes: reporting priority information of the duplicated data to the network side. The priority information of the duplicated data may be set according to an actual situation, and different duplicated data may correspond to different priorities.

Further, the method further includes: reporting information about a logical channel or a logical channel group of the duplicated data to the network side. As two RLC entities that respectively correspond to the duplicated data may be separately sent on different logical channels, the logical channels on which the two RLC entities of the duplicated data are about to be sent may be reported to the network side in advance. Still further, the logical channels that correspond to the duplicated data may be located in specific logical channel groups, so that the logical channel groups that correspond to the duplicated data may be also reported to the network side.

Scenario 2: when the logical channel or the logical channel group is used to distinguish the data volumes:

configuration information sent from the network side is received, where the configuration information includes correspondences, that are configured by the network side, between the duplicated data and different logical channels or logical channel groups, and between the non-duplicated data and different logical channels or logical channel groups.

Alternatively, configuration information sent from the network side is received, where the configuration information includes correspondences, that are configured by the network side, between different logical channels or logical channel groups and data reliability requirement information.

That is, the duplicated data and the non-duplicated data respectively correspond to the different logical channels or logical channel groups, or different reliability requirements (for example, may be a bit error rate) respectively correspond to the different logical channels or logical channel groups.

It should be further noted that, the configuration information further includes: logical channels or logical channel groups that respectively correspond to two RLC entities of the duplicated data. That is, the two RLC entities corresponding to the duplicated data may also respectively correspond to the different logical channels, or the logical channels on which the two RLC entities are located are respectively in different logical channel groups.

Still further, the configuration information further includes: priority information that corresponds to different logical channels or different logical channel groups.

Specifically, the sending information about data volumes of to-be-reported duplicated data and non-duplicated data to a network side includes: respectively making the data volume of the duplicated data and the data volume of the non-duplicated data correspond to the different logical channels, the different logical channel groups, identifiers of the logical channels, or identifiers of the different logical channel groups, and reporting to the network side. It may be understood that data volumes of the two RLC entities that respectively correspond to the duplicated data and the data volume of the non-duplicated data are respectively distinguished by using the different logical channels, the different logical channel groups, identifiers of the logical channels, or identifiers of the different logical channel groups, and then are reported. For example, the user makes the data that is used for duplication and the data that is used for non-duplication correspond to different logical channels (groups) according to the configuration. The user distinguishes the data volumes that are used for duplication and non-duplication reported by using different logical channels (groups) and/or identifiers of the logical channels (groups).

In addition, similar to scenario 1, the network side may further control whether to allow data with a specific destination address to be used for duplication, and control data that may be specific to a specific priority.

The configuration of the logical channels (groups) may be further combined with priorities, that is, different logical channels (groups) not only correspond to whether to be used for duplication, but also correspond to different priorities.

The information about the data volumes of the to-be-reported duplicated data and non-duplicated data is sent to the network side, where the sending the duplicated data may be specifically: respectively making data volumes of the two RLC entities of the duplicated data correspond to the different logical channels, identifiers of the different logical channels, the different logical channel groups, or identifiers of the different logical channel groups, and reporting to the network side.

That is, data volumes that correspond to all RLC entities in the duplicated data may also correspond to the identifiers of the different logical channels, the logical channels, the logical channel groups, or the identifiers of the logical channel groups, and are reported to the network side.

It should be further noted that, in the above two scenarios, the correspondences are specific to different destination addresses or destination address identifiers and are different from each other. That is, for the different destination addresses or destination address identifiers, different correspondences between reliability requirements and logical channels or logical channel groups may be configured, which includes whether the logical channels or the logical channel groups correspond to the reliability requirements; or, specific values of the reliability requirement information that correspond to the different destination addresses or destination address identifiers may be different.

It should be further noted that, in this embodiment, when the information about the data volumes of the to-be-reported duplicated data and non-duplicated data is sent to the network side, if the information about the data volumes of the duplicated data and the non-duplicated data whose priorities are the same is included, the information is processed according to the following processing manner:

sending the information about the data volumes of the to-be-reported duplicated data and non-duplicated data to the network side according to a preset order, where the order is one of the following:

giving a priority to sending the information about the data volume of the to-be-reported duplicated data to the network side;

giving a priority to sending the information about the data volume of the to-be-reported non-duplicated data to the network side; and automatically determining to give a priority to sending the information about the data volume of the to-be-reported duplicated data or non-duplicated data to the network side.

Specifically, when the priority of the information about the data volume of the to-be-reported duplicated data is the same as the priority of the information about the data volume of the to-be-reported non-duplicated data, the information about the data volumes of the to-be-reported duplicated data and non-duplicated data is sent to the network side according to the preset order; and when the priority of the information about the data volume of the to-be-reported duplicated data is different from the priority of the information about the data volume of the to-be-reported non-duplicated data, the information about the data volumes of the to-be-reported duplicated data and non-duplicated data is sent to the network side according to the priorities.

That is, when the priorities of the information about the data volumes of the duplicated data and the non-duplicated data are different, the comparison of the preset order may be not carried out, and the information is reported according to the priorities. When the priorities of the information about the data volumes of the duplicated data and the non-duplicated data are the same, the information that a priority is given to reporting is determined according to the above manner.

Figure 2:
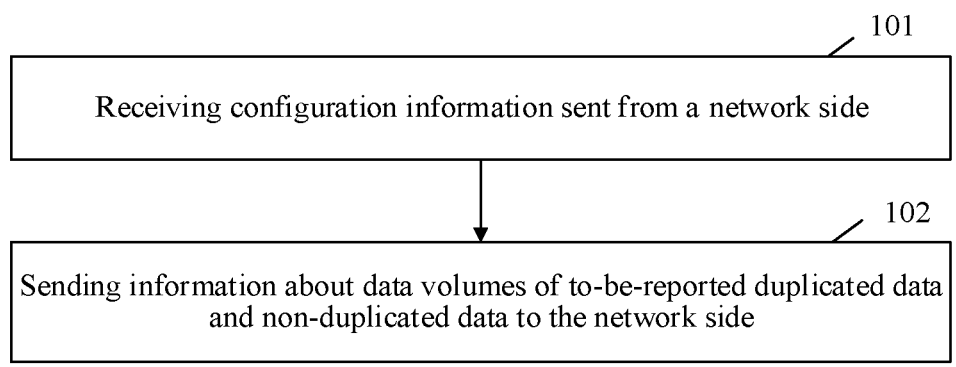
FIG. 2 is a schematic flowchart of a method for reporting a data volume of data duplication provided in an embodiment of the present disclosure.

With reference to the two scenarios, a specific processing process provided in this embodiment may be seen in FIG. 2, including:

step 101: receiving configuration information sent from the network side; and step 102: sending information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

The configuration information may include at least part of contents of the configuration information described in the above scenarios.

It can be seen that, if the above solution is used, the data volumes of the duplicated data and the non-duplicated data can be distinguishably reported to the network side by using the different logical channels, logical channel groups, destination addresses, or destination address identifiers, so that the network side can know a sending status of information about the UE side. Therefore, a problem that the network side cannot know data volumes that are transmitted by the UE under different transmission modes can be resolved.

Embodiment 2

An embodiment of the present disclosure provides a method for reporting a data volume of data duplication, applied to a network device, and the method includes:

receiving information about data volumes of duplicated data and non-duplicated data that are sent from user equipment, where the information about the data volumes of the duplicated data and the non-duplicated data is distinguished by using at least one of the following information: a logical channel, a logical channel group, a destination address, and a destination address identifier.

That is, the user equipment needs to distinguishably report data volumes that are used for duplication and non-duplication by using at least one of the following: the logical channel, the logical channel group, the destination address, and the destination address identifier.

The receiving information about data volumes of duplicated data and non-duplicated data that are sent from user equipment includes: receiving, through RRC information and/or a MAC CE, the information about the data volumes of the duplicated data and the non-duplicated data that are sent from the user equipment.

Two manners are described separately. Scenario 1: when the destination address or the destination address identifier is used:

A manner is: receiving different destination addresses or different destination address identifiers that are used to distinguish the data volumes of the duplicated data and the non-duplicated data and that are reported by the user equipment.

That is, the user distinguishably reports a destination address that is used for duplication and a destination address that is used for non-duplication to a network.

Another manner is: receiving reliability requirement information of the duplicated data and the non-duplicated data that correspond to different destination addresses or destination address identifiers, where the reliability requirement information is reported by the user equipment.

That is, the user may send reliability requirement information corresponding to different data to the network side, and then send the corresponding duplicated data, and the reliability requirement information and a data volume that correspond to the duplicated data at the different destination addresses or destination address identifiers. The user may also send the non-duplicated data, and the reliability requirement information and a data volume that correspond to the non-duplicated data.

The reliability requirement information includes at least one of the following: whether data is associated with a reliability requirement; and a specific value of the reliability requirement information. That is, whether the target data is associated with the reliability requirement may be included in the reliability requirement information. In addition, specific data in the reliability requirement information may be further included. For example, different data in data 1, 2, and 3 may correspond to a reliability requirement A or B or C thereof, or may merely correspond to a certain specific value thereof. Examples are not fully listed herein.

Further, before the above processing is performed, the network side may further control whether to allow data with a specific destination address to be used for duplication, which is specifically: sending configuration information to the user equipment, where the configuration information includes information about whether the user equipment is allowed to perform data duplication on the destination addresses or the destination address identifiers.

Accordingly, when the configuration information allows the data duplication, the subsequent processing may be performed; otherwise, the data duplication is not performed.

Then the user distinguishes data volumes that are used for duplication and non-duplication and reported by using the different destination addresses and/or destination address identifiers.

Further, the method further includes:

obtaining priority information of the duplicated data sent from the user equipment. The priority information of the duplicated data may be set according to an actual situation, and different duplicated data may correspond to different priorities.

In addition, information about a logical channel or a logical channel group of the duplicated data that is sent from the user equipment may be further obtained. As two RLC entities that respectively correspond to the duplicated data may be separately sent on different logical channels, the logical channels on which the two RLC entities of the duplicated data are about to be sent may be reported to the network side in advance. Still further, the two logical channels that correspond to the duplicated data may be respectively located in different logical channel groups, so that the logical channel groups that correspond to the duplicated data may be also reported to the network side.

Scenario 2: when the logical channel or the logical channel group is used to distinguish the data volumes:

configuration information is sent to the user equipment.

The configuration information includes correspondences, that are configured by the network side, between the duplicated data and different logical channels or logical channel groups, and between the non-duplicated data and different logical channels or logical channel groups.

It should be noted that the duplicated data and the non-duplicated data respectively correspond to different logical channels or different logical channel groups.

Alternatively, configuration information is sent to the user equipment.

The configuration information includes correspondences, that are configured by the network side, between different logical channels or logical channel groups and data reliability requirement information.

That is, the duplicated data and the non-duplicated data respectively correspond to the different logical channels or logical channel groups, and respectively correspond to reliability requirement information (for example, may be a bit error rate).

It should be further noted that, the configuration information further includes: logical channels or logical channel groups that respectively correspond to two RLC entities of the duplicated data. That is, the two RLC entities corresponding to the duplicated data may also respectively correspond to the different logical channels, or the logical channels on which the two RLC entities are located are respectively in different logical channel groups.

Still further, the configuration information further includes: priority information that corresponds to different logical channels or different logical channel groups.

Specifically, the data volumes of the duplicated data and the non-duplicated data that respectively correspond to the different logical channels, the different logical channel groups, identifiers of the logical channels, or identifiers of the different logical channel groups are received. It may be understood that data volumes of the two RLC entities that respectively correspond to the duplicated data and the data volume of the non-duplicated data are respectively distinguished by using the different logical channels, the different logical channel groups, identifiers of the logical channels, or identifiers of the different logical channel groups, and then are reported. For example, the user makes the data that is used for duplication and the data that is used for non-duplication correspond to different logical channels (groups) according to the configuration. The user distinguishes the data volumes that are used for duplication and non-duplication reported by using different logical channels (groups) and/or identifiers of the logical channels (groups).

In addition, similar to scenario 1, the network side may further control whether to allow data with a specific destination address to be used for duplication, and control data that may be specific to a specific priority.

The configuration of the logical channels (groups) may be further combined with priorities, that is, different logical channels (groups) not only correspond to whether to be used for duplication, but also correspond to different priorities.

The receiving the duplicated data may be specifically: respectively making data volumes of the two RLC entities of the duplicated data correspond to the different logical channels, identifiers of the different logical channels, the different logical channel groups, or identifiers of the different logical channel groups, to obtain the data volumes of the two RLC entities of the duplicated data.

That is, data volumes that correspond to all RLC entities in the duplicated data may also correspond to the identifiers of the different logical channels, the logical channels, the logical channel groups, or the identifiers of the logical channel groups, and are reported to the network side.

It should be further noted that, in the above two scenarios, the correspondences are specific to different destination addresses or destination address identifiers and are different from each other. That is, for the different destination addresses or destination address identifiers, different correspondences between reliability requirements and logical channels or logical channel groups may be configured, which includes whether the logical channels or the logical channel groups correspond to the reliability requirements; or, specific values of the reliability requirement information that correspond to the different destination addresses or destination address identifiers may be different.

It should be further noted that, in this embodiment, when the information about the data volumes of the to-be-reported duplicated data and non-duplicated data of the user equipment is received, if the information about the data volumes of the duplicated data and the non-duplicated data whose priorities are the same is included, the information is processed according to the following processing manner:

receiving the information about the data volumes of the duplicated data and the non-duplicated data that are sent from the user equipment according to a preset order, where the order is one of the following:

giving a priority to sending the information about the data volume of the to-be-reported duplicated data;

giving a priority to sending the information about the data volume of the to-be-reported non-duplicated data; and determining, by the user equipment, to give a priority to sending the information about the data volume of the to-be-reported duplicated data or non-duplicated data to the network side.

Specifically, when the priority of the information about the data volume of the to-be-reported duplicated data is the same as the priority of the information about the data volume of the to-be-reported non-duplicated data, the information about the data volumes of the duplicated data and the non-duplicated data that are sent from the user equipment according to the preset order is received; and when the priority of the information about the data volume of the to-be-reported duplicated data is different from the priority of the information about the data volume of the to-be-reported non-duplicated data, the information about the data volumes of the to-be-reported duplicated data and non-duplicated data that are sent from the user equipment according to the priorities is received.

That is, when the priorities of the information about the data volumes of the duplicated data and the non-duplicated data are different, the comparison of the preset order may be not carried out, and the information is received according to the priorities. When the priorities of the information about the data volumes of the duplicated data and the non-duplicated data are the same, the network device determines, according to the above manner, what kind of information is currently received.

It can be seen that, if the above solution is used, the data volumes of the duplicated data and the non-duplicated data can be distinguishably reported to the network side by using the different logical channels, logical channel groups, destination addresses, or destination address identifiers, so that the network side can know a sending status of information about the UE side. Therefore, a problem that the network side cannot know data volumes that are transmitted by the UE under different transmission modes can be resolved.

Embodiment 3

Figure 3:
FIG. 3 is a schematic structural diagram of composition of user equipment according to an embodiment of the present disclosure.

As shown in FIG. 3, an embodiment of the present disclosure provides user equipment, including:

a first communications unit 31, sending information about data volumes of to-be-reported duplicated data and non-duplicated data to a network side, where the information about the data volumes of the duplicated data and the non-duplicated data is distinguished by using at least one of the following information: a logical channel, a logical channel group, a destination address, and a destination address identifier.

That is, the user equipment needs to distinguishably report data volumes that are used for duplication and non-duplication by using at least one of the following: the logical channel, the logical channel group, the destination address, and the destination address identifier.

The manner in which a user reports, that is, the first communications unit 31 sends the information about the data volumes of the to-be-reported duplicated data and non-duplicated data to the network side through radio resource control (RRC) information and/or a MAC CE.

Two manners are described separately. Scenario 1: when the destination address or the destination address identifier is used:

A manner is: reporting, by the first communications unit 31, different destination addresses or different destination address identifiers that are used to distinguish the data volumes of the duplicated data and the non-duplicated data to the network side.

That is, the user distinguishably reports a destination address that is used for duplication and a destination address that is used for non-duplication to a network.

Another manner is: reporting, by the first communications unit 31, reliability requirement information of the duplicated data and the non-duplicated data that correspond to different destination addresses or destination address identifiers to the network side.

That is, the user may send reliability requirement information corresponding to different data to the network side, and then send the corresponding duplicated data, and the reliability requirement information and a data volume that correspond to the duplicated data at the different destination addresses or destination address identifiers. The user may also send the non-duplicated data, and the reliability requirement information and a data volume that correspond to the non-duplicated data.

The reliability requirement information includes at least one of the following: whether data is associated with a reliability requirement; and a specific value of the reliability requirement information. That is, whether the target data is associated with the reliability requirement may be included in the reliability requirement information. In addition, specific data in the reliability requirement information may be further included. For example, different data in data 1, 2, and 3 may correspond to a reliability requirement A or B or C thereof, or may merely correspond to a certain specific value thereof. Examples are not fully listed herein.

Further, the information about the data volumes of the duplicated data and the non-duplicated data that is distinguished by using different destination addresses or different destination address identifiers are reported to the network side.

In addition, before the above processing is performed, the network side may further control whether to allow data with a specific destination address to be used for duplication. Specifically, the user equipment further includes:

a first processing unit 32, receiving, by using the first communications unit 31, configuration information sent from the network side, where the configuration information includes information about whether the network side allows the user equipment to perform data duplication on the destination addresses or the destination address identifiers.

Accordingly, when the configuration information allows the data duplication, the subsequent processing may be performed; otherwise, the data duplication is not performed.

Then the user distinguishes data volumes that are used for duplication and non-duplication and reported by using the different destination addresses and/or destination address identifiers.

The first communications unit 31 may further report priority information of the duplicated data to the network side. The priority information of the duplicated data may be set according to an actual situation, and different duplicated data may correspond to different priorities.

In addition, the first communications unit 31 may further report information about a logical channel or a logical channel group of the duplicated data to the network side. As two RLC entities that respectively correspond to the duplicated data may be separately sent on different logical channels, the logical channels on which the two RLC entities of the duplicated data are about to be sent may be reported to the network side in advance. Still further, the logical channels that correspond to the duplicated data may be located in specific logical channel groups, so that the logical channel groups that correspond to the duplicated data may be also reported to the network side.

Scenario 2: when the logical channel or the logical channel group is used to distinguish the data volumes:

The first communications unit 31 receives configuration information sent from the network side, where the configuration information includes correspondences, that are configured by the network side, between the duplicated data and different logical channels or logical channel groups, and between the non-duplicated data and different logical channels or logical channel groups.

Alternatively, the first communications unit 31 receives configuration information sent from the network side, where the configuration information includes correspondences, that are configured by the network side, between different logical channels or logical channel groups and data reliability requirement information.

That is, the duplicated data and the non-duplicated data respectively correspond to the different logical channels or logical channel groups, or different reliability requirements (for example, may be a bit error rate) respectively correspond to the different logical channels or logical channel groups.

It should be further noted that, the configuration information further includes: logical channels or logical channel groups that respectively correspond to two RLC entities of the duplicated data. That is, the two RLC entities corresponding to the duplicated data may also respectively correspond to the different logical channels, or the logical channels on which the two RLC entities are located are respectively in different logical channel groups.

Still further, the configuration information further includes: priority information that corresponds to different logical channels or different logical channel groups.

Specifically, the first processing unit 32 respectively makes the data volume of the duplicated data and the data volume of the non-duplicated data correspond to the different logical channels, the different logical channel groups, identifiers of the logical channels, or identifiers of the different logical channel groups, and reports to the network side. It may be understood that data volumes of the two RLC entities that respectively correspond to the duplicated data and the data volume of the non-duplicated data are respectively distinguished by using the different logical channels, the different logical channel groups, identifiers of the logical channels, or identifiers of the different logical channel groups, and then are reported. For example, the user makes the data that is used for duplication and the data that is used for non-duplication correspond to different logical channels (groups) according to the configuration. The user distinguishes the data volumes that are used for duplication and non-duplication reported by using different logical channels (groups) and/or identifiers of the logical channels (groups).

In addition, similar to scenario 1, the network side may further control whether to allow data with a specific destination address to be used for duplication, and control data that may be specific to a specific priority.

The configuration of the logical channels (groups) may be further combined with priorities, that is, different logical channels (groups) not only correspond to whether to be used for duplication, but also correspond to different priorities.

The information about the data volumes of the to-be-reported duplicated data and non-duplicated data is sent to the network side, where the sending the duplicated data may be specifically: respectively making, by the first processing unit 32, data volumes of the two RLC entities of the duplicated data correspond to the different logical channels, identifiers of the different logical channels, the different logical channel groups, or identifiers of the different logical channel groups, and reporting to the network side by using the first communications unit 31.

That is, data volumes that correspond to all RLC entities in the duplicated data may also correspond to the identifiers of the different logical channels, the logical channels, the logical channel groups, or the identifiers of the logical channel groups, and are reported to the network side.

It should be further noted that, in the above two scenarios, the correspondences are specific to different destination addresses or destination address identifiers and are different from each other. That is, for the different destination addresses or destination address identifiers, different correspondences between reliability requirements and logical channels or logical channel groups may be configured, which includes whether the logical channels or the logical channel groups correspond to the reliability requirements; or, specific values of the reliability requirement information that correspond to the different destination addresses or destination address identifiers may be different.

It should be further noted that, in this embodiment, when the information about the data volumes of the to-be-reported duplicated data and non-duplicated data is sent to the network side, if the information about the data volumes of the duplicated data and the non-duplicated data whose priorities are the same is included, the information is processed according to the following processing manner:

the first processing unit sends the information about the data volumes of the to-be-reported duplicated data and non-duplicated data to the network side according to a preset order by using the first communications unit, where the order is one of the following:

giving a priority to sending the information about the data volume of the to-be-reported duplicated data to the network side;

giving a priority to sending the information about the data volume of the to-be-reported non-duplicated data to the network side; and automatically determining to give a priority to sending the information about the data volume of the to-be-reported duplicated data or non-duplicated data to the network side.

Specifically, when the priority of the information about the data volume of the to-be-reported duplicated data is the same as the priority of the information about the data volume of the to-be-reported non-duplicated data, the information about the data volumes of the to-be-reported duplicated data and non-duplicated data is sent to the network side according to the preset order by using the first communications unit; and when the priority of the information about the data volume of the to-be-reported duplicated data is different from the priority of the information about the data volume of the to-be-reported non-duplicated data, the information about the data volumes of the to-be-reported duplicated data and non-duplicated data is sent to the network side according to the priorities.

That is, when the priorities of the information about the data volumes of the duplicated data and the non-duplicated data are different, the comparison of the preset order may be not carried out, and the information is reported according to the priorities. When the priorities of the information about the data volumes of the duplicated data and the non-duplicated data are the same, the information that a priority is given to reporting is determined according to the above manner.

It can be seen that, if the above solution is used, the data volumes of the duplicated data and the non-duplicated data can be distinguishably reported to the network side by using the different logical channels, logical channel groups, destination addresses, or destination address identifiers, so that the network side can know a sending status of information about the UE side. Therefore, a problem that the network side cannot know data volumes that are transmitted by the UE under different transmission modes can be resolved.

Embodiment 4

Figure 4:
FIG. 4 is a schematic structural diagram of composition of a network device according to an embodiment of the present disclosure.

As shown in FIG. 4, an embodiment of the present disclosure provides a network device, including:

a second communications unit 41, receiving information about data volumes of duplicated data and non-duplicated data that are sent from user equipment, where the information about the data volumes of the duplicated data and the non-duplicated data is distinguished by using at least one of the following information: a logical channel, a logical channel group, a destination address, and a destination address identifier.

That is, the user equipment needs to distinguishably report data volumes that are used for duplication and non-duplication by using at least one of the following: the logical channel, the logical channel group, the destination address, and the destination address identifier.

The second communications unit 41 receives, through RRC information and/or a MAC CE, the information about the data volumes of the duplicated data and the non-duplicated data that are sent from the user equipment.

Two manners are described separately. Scenario 1: when the destination address or the destination address identifier is used:

A manner is: receiving, by the second communications unit 41, different destination addresses or different destination address identifiers that are used to distinguish the data volumes of the duplicated data and the non-duplicated data and that are reported by the user equipment.

That is, the user distinguishably reports a destination address that is used for duplication and a destination address that is used for non-duplication to a network.

Another manner is: receiving, by the second communications unit 41, reliability requirement information of the duplicated data and the non-duplicated data that correspond to different destination addresses or destination address identifiers, where the reliability requirement information is reported by the user equipment.

That is, the user may send reliability requirement information corresponding to different data to the network side, and then send the corresponding duplicated data, and the reliability requirement information and a data volume that correspond to the duplicated data at the different destination addresses or destination address identifiers. The user may also send the non-duplicated data, and the reliability requirement information and a data volume that correspond to the non-duplicated data.

The reliability requirement information includes at least one of the following: whether data is associated with a reliability requirement; and a specific value of the reliability requirement information. That is, whether the target data is associated with the reliability requirement may be included in the reliability requirement information. In addition, specific data in the reliability requirement information may be further included. For example, different data in data 1, 2, and 3 may correspond to a reliability requirement A or B or C thereof, or may merely correspond to a certain specific value thereof. Examples are not fully listed herein.

Further, before the above processing is performed, the second communications unit 41 sends configuration information to the user equipment, where the configuration information includes information about whether the user equipment is allowed to perform data duplication on the destination addresses or the destination address identifiers.

Accordingly, when the configuration information allows the data duplication, the subsequent processing may be performed; otherwise, the data duplication is not performed.

Then the user distinguishes data volumes that are used for duplication and non-duplication and reported by using the different destination addresses and/or destination address identifiers.

Further, the second communications unit 41 obtains priority information of the duplicated data sent from the user equipment. The priority information of the duplicated data may be set according to an actual situation, and different duplicated data may correspond to different priorities.

In addition, the second communications unit 41 may further obtain information about a logical channel or a logical channel group of the duplicated data that is sent from the user equipment. As two RLC entities that respectively correspond to the duplicated data may be separately sent on different logical channels, the logical channels on which the two RLC entities of the duplicated data are about to be sent may be reported to the network side in advance. Still further, the logical channels that correspond to the duplicated data may be located in specific logical channel groups, so that the logical channel groups that correspond to the duplicated data may be also reported to the network side.

Scenario 2: when the logical channel or the logical channel group is used to distinguish the data volumes:

the second communications unit 41 sends configuration information to the user equipment; and the configuration information includes correspondences, that are configured by the network side, between the duplicated data and different logical channels or logical channel groups, and between the non-duplicated data and different logical channels or logical channel groups.

Alternatively, the second communications unit 41 sends configuration information to the user equipment.

The configuration information includes correspondences, that are configured by the network side, between different logical channels or logical channel groups and data reliability requirement information.

That is, the duplicated data and the non-duplicated data respectively correspond to the different logical channels or logical channel groups, or different reliability requirements (for example, may be a bit error rate) respectively correspond to the different logical channels or logical channel groups.

It should be further noted that, the configuration information further includes: logical channels or logical channel groups that respectively correspond to two RLC entities of the duplicated data. That is, the two RLC entities corresponding to the duplicated data may also respectively correspond to the different logical channels, or the logical channels on which the two RLC entities are located are respectively in different logical channel groups.

Still further, the configuration information further includes: priority information that corresponds to different logical channels or different logical channel groups.

Specifically, the data volumes of the duplicated data and the non-duplicated data that respectively correspond to the different logical channels, the different logical channel groups, identifiers of the logical channels, or identifiers of the different logical channel groups are received. It may be understood that data volumes of the two RLC entities that respectively correspond to the duplicated data and the data volume of the non-duplicated data are respectively distinguished by using the different logical channels, the different logical channel groups, identifiers of the logical channels, or identifiers of the different logical channel groups, and then are reported. For example, the user makes the data that is used for duplication and the data that is used for non-duplication correspond to different logical channels (groups) according to the configuration. The user distinguishes the data volumes that are used for duplication and non-duplication reported by using different logical channels (groups) and/or identifiers of the logical channels (groups).

In addition, similar to scenario 1, the network side may further control whether to allow data with a specific destination address to be used for duplication, and control data that may be specific to a specific priority.

The configuration of the logical channels (groups) may be further combined with priorities, that is, different logical channels (groups) not only correspond to whether to be used for duplication, but also correspond to different priorities.

The receiving the duplicated data may be specifically: the network device further includes:

a second processing unit 42, obtaining data volumes of the two RLC entities of the duplicated data from the different logical channels, identifiers of the different logical channels, the different logical channel groups, or identifiers of the different logical channel groups that respectively correspond to the data volumes of the two RLC entities of the duplicated data.

That is, data volumes that correspond to all RLC entities in the duplicated data may also correspond to the identifiers of the different logical channels, the logical channels, the logical channel groups, or the identifiers of the logical channel groups, and are reported to the network side.

It should be further noted that, in the above two scenarios, the correspondences are specific to different destination addresses or destination address identifiers and are different from each other. That is, for the different destination addresses or destination address identifiers, different correspondences between reliability requirements and logical channels or logical channel groups may be configured, which includes whether the logical channels or the logical channel groups correspond to the reliability requirements; or, specific values of the reliability requirement information that correspond to the different destination addresses or destination address identifiers may be different.

It should be further noted that, in this embodiment, when the information about the data volumes of the to-be-reported duplicated data and non-duplicated data is sent to the network side, if the information about the data volumes of the duplicated data and the non-duplicated data whose priorities are the same is included, the information is processed according to the following processing manner:

the second communications unit receives the information about the data volumes of the duplicated data and the non-duplicated data that are sent from the user equipment according to a preset order, where the order is one of the following:

giving a priority to sending the information about the data volume of the to-be-reported duplicated data;

giving a priority to sending the information about the data volume of the to-be-reported non-duplicated data; and determining, by the user equipment, to give a priority to sending the information about the data volume of the to-be-reported duplicated data or non-duplicated data to the network side.

Specifically, when the priority of the information about the data volume of the to-be-reported duplicated data is the same as the priority of the information about the data volume of the to-be-reported non-duplicated data, the second communications unit receives the information about the data volumes of the duplicated data and the non-duplicated data that are sent from the user equipment according to the preset order; and when the priority of the information about the data volume of the to-be-reported duplicated data is different from the priority of the information about the data volume of the to-be-reported non-duplicated data, the second communications unit receives the information about the data volumes of the to-be-reported duplicated data and non-duplicated data that are sent from the user equipment according to the priorities.

That is, when the priorities of the information about the data volumes of the duplicated data and the non-duplicated data are different, the comparison of the preset order may be not carried out, and the information is reported according to the priorities. When the priorities of the information about the data volumes of the duplicated data and the non-duplicated data are the same, the information that a priority is given to reporting is determined according to the above manner.

It can be seen that, if the above solution is used, the data volumes of the duplicated data and the non-duplicated data can be distinguishably reported to the network side by using the different logical channels, logical channel groups, destination addresses, or destination address identifiers, so that the network side can know a sending status of information about the UE side. Therefore, a problem that the network side cannot know data volumes that are transmitted by the UE under different transmission modes can be resolved.

Figure 5:
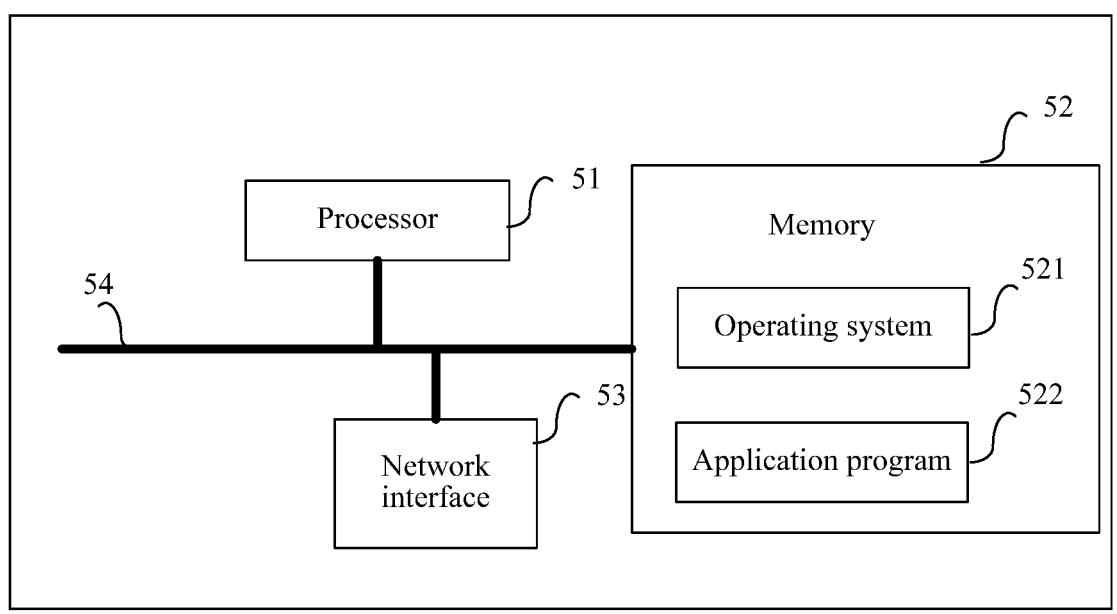
FIG. 5 is a schematic diagram of a hardware architecture according to an embodiment of the present disclosure.

An embodiment of the present disclosure further provides a hardware composition architecture of user equipment or a receiver device, as shown in FIG. 5, including: at least one processor 51, a memory 52, and at least one network interface 53. All components are coupled together by using a bus system 54. It may be understood that the bus system 54 is configured to implement the communication between these components. In addition to including a data bus, the bus system 54 further includes a power bus, a control bus, and a status signal bus. However, for clear description, all buses are marked as the bus system 54 in FIG. 5.

It may be understood that the memory 52 in this embodiment of the present disclosure may be a volatile memory or nonvolatile memory, or may include both the volatile memory and the nonvolatile memory.

In some implementations, the memory 52 stores the following elements, executable modules or data structures, or a subset thereof, or an extended set thereof:

an operating system 521 and an application program 522.

The processor 51 is configured to be capable of processing the steps of the method in the embodiment 1. Details are not described herein again.

An embodiment of the present disclosure provides a computer storage medium, where the computer storage medium stores a computer executable instruction, and when executed, the computer executable instruction implements steps of the method in the above embodiment 1.

When the above apparatus of the embodiments of the present disclosure is implemented in a form of a software functional module and sold or used as an independent product, the apparatus may be stored in a computer-readable storage medium. Based on such an understanding, the technical solutions of the embodiments of the present disclosure essentially, or the part contributing to the prior art may be implemented in the form of a software product. The computer software product is stored in a storage medium, and includes several instructions for instructing a computer device (which may be a personal computer, a server, a network device, or the like) to perform all or a part of the method described in the embodiments of the present disclosure. The above storage medium includes: any medium that can store program codes, such as a USB flash disk, a removable hard disk, a read-only memory (ROM), a magnetic disk, or an optical disc. Therefore, the embodiments of the present disclosure are not limited to any specific combination of hardware and software.

Accordingly, an embodiment of the present disclosure further provides a computer storage medium, where the computer storage medium stores a computer program, and the computer program is configured to execute the data scheduling method of the embodiments of the present disclosure.

Although preferred embodiments of the present disclosure have been disclosed for the purpose of an example, a person skilled in the art may be aware that any improvement, addition or replacement may also be possible. Therefore, the scope of the present disclosure should not be limited to the above embodiments.

What is claimed is:

1. A method for reporting a data volume of data duplication, applied to user equipment, and the method comprising:
 sending information about data volumes of to-be-reported duplicated data and non-duplicated data to a network side,
  wherein the information about the data volumes of the duplicated data and the non-duplicated data is distinguished by using at least one of the following information: a logical channel, a logical channel group, a destination address, and a destination address identifier; and
 receiving configuration information from the network side,
  wherein the configuration information comprises correspondences, that are configured by the network side, between different logical channels or logical channel groups and data reliability requirement information, and the configuration information further comprises priority information that corresponds to the different logical channels or the different logical channel groups,
  wherein the data reliability requirement information comprises at least one of:
   whether the logical channels or the logical channel groups correspond to a reliability requirement; or
   a specific value of the data reliability requirement information that corresponds to the logical channels or the logical channel groups.

2. The method according to claim 1, wherein the sending information about data volumes of to-be-reported duplicated data and non-duplicated data to a network side comprises:
 sending the information about the data volumes of the to-be-reported duplicated data and non-duplicated data to the network side through radio resource control (RRC) information and/or a MAC CE.

3. The method according to claim 1, further comprising:
 reporting different destination addresses or different destination address identifiers that are used to distinguish the data volumes of the duplicated data and the non-duplicated data to the network side.

4. The method according to claim 1, further comprising:
 reporting reliability requirement information of the duplicated data and the non-duplicated data that correspond to different destination addresses or destination address identifiers to the network side.

5. The method according to claim 4, wherein the reliability requirement information comprises at least one of:
 whether data is associated with a reliability requirement, or
 a specific value of the reliability requirement information.

6. The method according to claim 1, wherein
 the correspondences are specific to different destination addresses or destination address identifiers.

7. The method according to claim 1, wherein the configuration information further comprises:
 logical channels or logical channel groups that respectively correspond to two RLC entities of the duplicated data.

8. A non-transitory computer storage medium, having stored computer executable instructions therein that, when executed by a processor of a terminal device, cause the terminal device to implement the method according to claim 1.

9. User equipment, comprising:
 a processor;
 a memory configured to store instructions executable by the processor; and
 a network device, connected with the processor and the memory, and configured to send and receive information under control of the processor;
 wherein the processor is configured to control the network interface to send information about data volumes of to-be-reported duplicated data and non-duplicated data to a network side,
  wherein the information about the data volumes of the duplicated data and the non-duplicated data is distinguished by using at least one of the following information: a logical channel, a logical channel group, a destination address, and a destination address identifier,
 wherein the network interface is configured to receive configuration information from the network side, wherein the configuration information comprises correspondences, that are configured by the network side, between different logical channels or logical channel groups and data reliability requirement information, and the configuration information further comprises priority information that corresponds to the different logical channels or the different logical channel groups,
wherein the data reliability requirement information comprises at least one of:
- whether the logical channels or the logical channel groups correspond to a reliability requirement; or
- a specific value of the data reliability requirement information that corresponds to the logical channels or the logical channel groups.

10. The user equipment according to claim 9, wherein the network interface is configured to send the information about the data volumes of the to-be-reported duplicated data and non-duplicated data to the network side through radio resource control (RRC) information and/or a MAC CE.

11. The user equipment according to claim 9, wherein the network interface is configured to report different destination addresses or different destination address identifiers that are used to distinguish the data volumes of the duplicated data and the non-duplicated data to the network side.

12. The user equipment according to claim 9, wherein the network interface is configured to report reliability requirement information of the duplicated data and the non-duplicated data that correspond to different destination addresses or destination address identifiers to the network side.

13. The user equipment according to claim 12, wherein the reliability requirement information comprises at least one of:
- whether data is associated with a reliability requirement; or
- a specific value of the reliability requirement information.

14. The user equipment according to claim 9, wherein the correspondences are specific to different destination addresses or destination address identifiers and are different from each other.

15. The user equipment according to claim 9, wherein the configuration information further comprises:
- logical channels or logical channel groups that respectively correspond to two RLC entities of the duplicated data.

* * * * *